United States Patent
Dirkx

(10) Patent No.: US 10,310,465 B2
(45) Date of Patent: Jun. 4, 2019

(54) DEVICE AND METHOD FOR MOVING AN OBJECT

(71) Applicant: Robert Bosch GmbH, Stuttgart (DE)

(72) Inventor: Walrick Dirkx, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 14/848,470

(22) Filed: Sep. 9, 2015

(65) Prior Publication Data

US 2016/0077505 A1  Mar. 17, 2016

(30) Foreign Application Priority Data

Sep. 11, 2014  (EP) .................................. 14184339

(51) Int. Cl.
  *G05B 17/02*  (2006.01)
  *G05B 19/19*  (2006.01)

(52) U.S. Cl.
  CPC .......... *G05B 17/02* (2013.01); *G05B 19/19* (2013.01); *G05B 2219/34005* (2013.01); *G05B 2219/41222* (2013.01); *G05B 2219/41233* (2013.01)

(58) Field of Classification Search
  CPC ............. G05B 17/02; G05B 19/19; G05B 2219/34005; G05B 2219/41222; G05B 2219/41233
  USPC ......................................................... 700/275
  See application file for complete search history.

(56) References Cited

U.S. PATENT DOCUMENTS

| 6,002,231 | A | * | 12/1999 | Dirkx | G05B 19/416 318/561 |
| 2006/0089748 | A1 | | 4/2006 | Ha | |
| 2006/0290314 | A1 | * | 12/2006 | Stoecker | G11B 5/596 318/651 |
| 2007/0258079 | A1 | * | 11/2007 | Kamidi | G03F 7/70725 355/72 |
| 2009/0167231 | A1 | * | 7/2009 | Sussmeier | H02P 5/695 318/610 |
| 2009/0322275 | A1 | * | 12/2009 | DePoi | G05B 11/42 318/619 |
| 2013/0234642 | A1 | | 9/2013 | Igarashi et al. | |
| 2013/0307459 | A1 | * | 11/2013 | Tian | G05B 19/416 318/570 |

FOREIGN PATENT DOCUMENTS

EP  1 550 924 A1  7/2005

OTHER PUBLICATIONS

European Search Report corresponding to EP Application No. 14184339.1; dated Feb. 25, 2015; 6 pages; European Patent Office, Munich, Germany.

* cited by examiner

*Primary Examiner* — Robert E Fennema
*Assistant Examiner* — Jigneshkumar C Patel
(74) *Attorney, Agent, or Firm* — Maginot, Moore & Beck LLP

(57) ABSTRACT

A device and method for the generation of a constraint-based, preferably time-optimal motion profile is presented. The device 100 comprises a control unit 102, said control unit 102 is configured to control a mechanical system 104, whereas an alike comprised set-point generator 101 delivers set points for the control unit 102. A moving average filter 111 is coupled to said generator 101. By application of the moving average filter 111 a piecewise constant set point profile changes into a piecewise linear profile. This has several positive effects as explained in the disclosure, while a moving object is driven via the mechanism.

14 Claims, 7 Drawing Sheets

DEVICE AND METHOD FOR MOVING AN OBJECT

This application claims priority under 35 U.S.C. § 119 to application no. EP 14184339.1, filed on Sep. 11, 2014 in Europe, the disclosure of which is incorporated herein by reference in its entirety.

BACKGROUND

This disclosure generally relates to motion control and specifically to generation of constraint-based, preferably time-optimal motion profiles. The invention relates to a device for moving an object and to a method for moving an object.

Most automation applications require a motion control system to control e.g. a position of a moving object. Such motion control systems typically comprise a device for moving an object including a control unit, one or more motors or similar actuating devices operating under the guidance of said device, which sends position control instructions to the motor. In a common architecture, the device sends the control instructions to a motor drive and the motor drive controls the driving current output to the motor in accordance with the control instructions, facilitating the controlled movement of the motor.

If the device determines that the object must move to a new position, set points must be calculated, which are used as an input value for said control unit and which represent a desired position or velocity at a specific time for the object in motion. For the calculation of said set points a set point generator means is used. To this end an algorithm deployed within said device is typically used. Said algorithm determines a set point profile, which represents set points as a function of time. Said algorithm also determines the first up till $n^{th}$ derivative of this function of time. If the function of time represents e.g. a position, said derivatives represent e.g. velocity, acceleration, jerk and possibly higher derivatives like the snap and the crackle as a function of time.

Once the set point profile is calculated, the control unit translates the set point profile into appropriate control signaling for moving the object along a trajectory, i.e. a path for the object along a single line or within a working cell. Many industrial applications require time-optimal solutions with low vibrations and a minimized lag during a change in system stage, e.g. high precision machines employed in the semiconductor industry.

Typical set point generators use algorithms that produce second or third order polynomial profiles or S-curve profiles. While the aforementioned second or third order polynomial profiles are normally not smooth enough for low vibrations, the aforementioned S-curve profiles are normally not time-optimal. Thus these known standard motion system have a limited control performance. Pure numerical higher order solutions with time-optimal profiles are complex and demand a very high computing power.

For the foregoing reasons there is a need for a solution for increased control performance, especially in high precision environments considering limitations in computing power.

SUMMARY

The present invention is directed to a device and a method for moving an object that meets these needs. One or more embodiments of this disclosure relates to devices and methods for moving an object with increased control performance. The following presents a simplified summary of one or more embodiments of both the devices and methods in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

To achieve increased control performance, a filter means is used to smooth the set point profile, before it is used as an input for the control unit, which translates the set point profile into appropriate control signaling for a drive used for moving an object along a trajectory. To this end an algorithm deployed within said device is typically used for an implementation of said filter means. The usage of filtered said set point profiles and preferably of filtered derivatives of said set point profiles by said control unit reduces the excitation of vibrations while the object is moving. It also allows the device to arrange automated and very precise changes of the position of an object, even on the fly. For further improvements of precision the control unit and drive is configured as a closed loop arrangement.

In another aspect, one or more embodiments of the devices and methods for moving an object described herein can further improve control performance by adding a feed forward contribution to the output of said control unit based on derivatives of said set point profile, e.g. the velocity, acceleration, jerk, snap, if the set point profile represents a position of the object. To this end an algorithm deployed within said device is typically also used to implement said feed forward means. The algorithm generates a feed forward signal by summing up the derivatives of the set point profile, said derivatives being additionally multiplied by a respective coefficient. The device is configured to add the feed forward contribution to the output of the control unit. The sum of the output of the control unit and the output of the feed forward means is used to drive a motor, wherein the drive controls the driving current output to the motor in accordance with control instructions, facilitating the controlled movement of the motor and thus of the object.

According to another aspect one or more embodiments of the devices and methods for moving an object described herein can further improve control performance by using a filter means that is configured to create the average of said set point profile and said derivatives over a configurable number of set point samples based on a set point sample rate or over a configurable time interval. Said filter means could also be configured to determine a weighted average and/or comprise the functionality of an FIR or IIR filter.

The following description and the annexed drawings detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
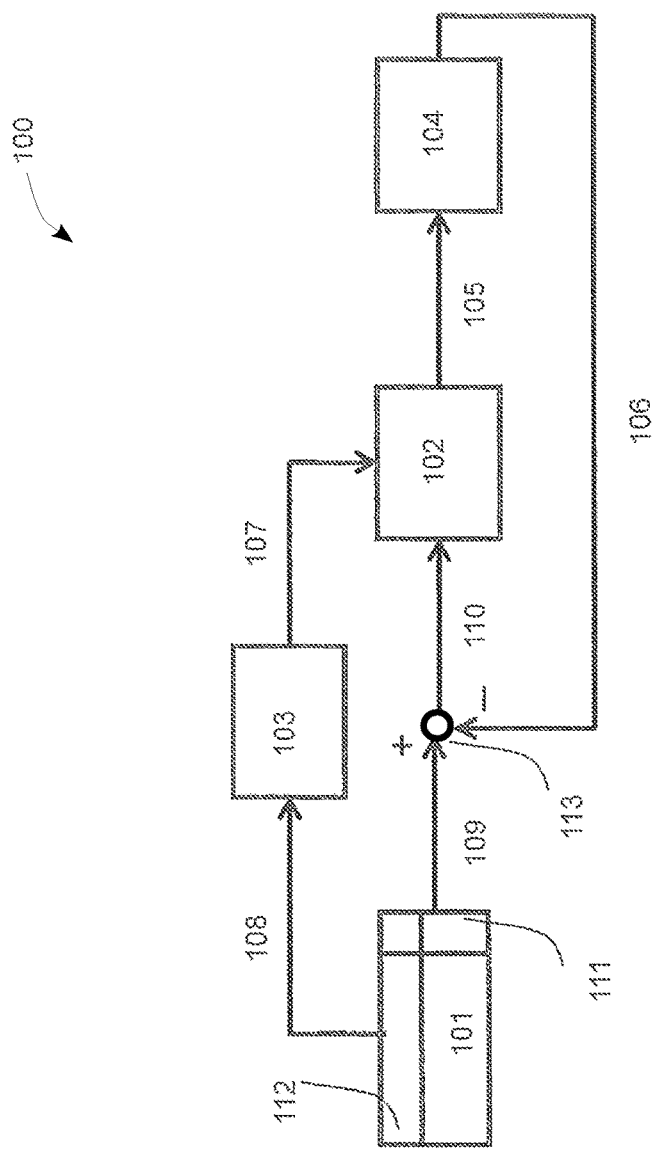
FIG. 1 shows an exemplary motion control architecture with a set point generator.

Various illustrative embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form or flow chart form to facilitate describing one or more embodiments.

Devices and methods described herein relate to techniques for generating constraint-based, ideally time-optimal and filtered set point profiles, typically with end point correction, including also end point correction on the fly while an object is in motion.

To illustrate an exemplary context for the functionality of the device 100 and method 700 described herein, FIG. 1 depicts a simplified device, comprising a closed-loop motion control architecture with feed forward contribution and set point generation. This device can also be the basis for the implementation of the method 700.

The device 100 can comprise a control unit 102 that can be programmed to control a system 104, said system comprising a drive, an actuator or a motor, mechanics, and a position sensor device, e.g. an encoder, to drive an object (not shown in detail). To put this into effect the drive controls the speed and direction said actuator/motor (not shown) by varying the power delivered to said actuator/motor in accordance with the controller output 105 of the control unit 102. The object can be mechanically attached to the motor, wherein can realize a linear and/or rotational motion of said object.

The device 100 can also comprise a generator means 101 that can be configured to generate a set point profile for said control unit 102, either a position profile and/or a velocity profile.

Said generator means 101 can cover all types of set point profiles, which are generated as a function of time, for example point-to-point profiles, jog profiles, hermite splines, cubic splines, and variations thereof.

The device 100 can also comprise a feed forward means 103 to reduce the lag between the generated set point profiles and the actual behavior of the object. To this end the feed forward means 103 can be configured to deliver a feed forward contribution 107 to the control unit 102, which again is configured to consider said feed forward contribution 107 while generating said output 105 for said system 104.

The generator means 101 can also be configured to generate derivatives 108 of said set point profile, said derivatives can be used for the purpose of an input for the feed forward means 103. The feed forward means 103 sums up the said derivatives after said derivatives being multiplied by a respective coefficient (not shown). This helps to reduce the following error 110, which is equivalent to the difference of signal 109 and signal 106, when for example the object is cruising at a constant velocity.

A first filter means 111 with a filter input and a filter output can be coupled to said generator 101 means or can be comprised by said generator 101 means. Said first filter means 111 filters the generated set points, before said set points are used for the purpose of an input 109 for the control unit 102.

A second filter means 112 with a filter input and a filter output can be coupled to said generator 101 means or can be comprised by said generator 101 means. Said second filter means 112 filters said derivatives which can subsequently be used for the purpose of an input for said feed forward means 103.

Said filter means 111, 112 can be configured to create the average of said set point profile over a function of time and over a configurable, e.g. user-entered, number of set point samples based on a set point sample rate that can be identical to the clock of the control unit 102 or over a configurable (e.g. user-entered) time interval that can have a relationship to said clock. Said filter means 111, 112 can also be configured to determine a weighted average. In some embodiments it can comprise the functionality of FIR or IIR filters.

Thus the order of said generator means 101 can be increased by applying said filters to the outputs of said generator means 101. In one embodiment the filter 111, 112 can be a time-discrete filter, implemented by means of an algorithm as follows:

$$y_k = \frac{1}{N_{MA}}(u_k + u_{k-1} + \ldots + u_{k-N_{MA}+1})$$

The filter inputs are denoted u, and the filter outputs are denoted y. This filter actually outputs the average over the last $N_{MA}$ inputs. $N_{MA}$ represents the number of samples.

In another embodiment the filter 111, 112 can also be implemented as a time-continuous filter, implemented by means of an algorithm as follows:

$$y(t) = \frac{1}{T_{MA}} \int_{t-T_{MA}}^{t} u(\tau)d\tau$$

This filter actually outputs the average over the last time interval of length $T_{MA}$. $T_{MA}$ represents a time.

In further embodiments a mixture of time-discrete and time-continuous filters can be used, e.g. it is possible to put a time-discrete filter and a time-continuous filter in series.

The filter 111, 112 can have at least the following properties:

1. If the input of the filter 111, 112 is constrained, the output satisfies said constraints.
2. If constraints on the input are modified, it takes at most the same time as for the input, augmented by the moving average time, until the output also satisfies said modified constraints. The moving average time is defined as the length of the filter: $N_{MA}$ samples for the time-discrete version and $T_{MA}$ for the time-continuous version of the filter.
3. If u and v are functions of time, u is the derivative of v, and both signals are filtered by the same moving average filter 111, 112, the output associated with input u is the derivative of the output associated with input v.

4. If the input of the moving average time remains constant for at least the moving average time, the output is constant at the same value from the moving average time after the input has become constant.
5. If the input of the filter is built up by $k^{th}$ order polynomial segments, the output is built up by $(k+1)^{th}$ order polynomial segments.
6. If the input of the filter is $dx_u(t)/dt$, which is the derivative of $x_u(t)$, then the output of the filter, $x_y(t)$ equals:

$$x_y(t)=(x_u(t)-x_u(t-T_{MA}))/T_{MA}$$

Typically the device 100 comprises furthermore an interface component (not shown) to define constraints for the generator means 101, one or more processors (not shown) and memory (not shown). In some embodiments components 101, 102, 103 and/or said device comprised by the system 104 can comprise or can be implemented as software instructions stored on said memory and executed by said processor(s). The generator means 101 may also interact with other hardware and/or software components not depicted in FIG. 1. For example, processor(s) may interact with one or more external user interface devices, such as a keyboard, a mouse, a display monitor, a touch screen, or other such interface devices.

Said Interface component can be configured to receive user input and to render output to the user in any suitable format (e.g., visual, audio, tactile, etc.). User input can be, for example, user-entered constraints (e.g., maximum acceleration, maximum velocity, etc.) used by the generator means 101 to calculate a set point profile. The generator means 101 can be configured to receive an indication of a desired target position/velocity for a motion system (not shown) and calculate a set point profile for transitioning to the target position/velocity without violating the user-defined constraints.

The device 100 can also comprise means (not shown) configured to process a modified set point profile for the purpose of an end point correction as a function of time based on modified constraints for the generator 101 means, either for an object in motion on the fly or for an object that is not in motion.

While FIG. 1 depicts the generator means 101 as including both a position profile generator and a velocity profile generator, it is to be appreciated that some embodiments of the device 100 or method 700 can include only a position profile generator or only a velocity profile generator without deviating from the scope of this disclosure. The one or more processor(s) can perform one or more of the functions described herein with reference to the devices 100 and/or methods 700 disclosed.

Said Memory can be a computer-readable storage medium storing computer-executable instructions and/or information for performing the functions described herein with reference to the systems and/or methods disclosed, especially algorithms used to implement the functionality of said generator means 101, feed forward means 103, control unit 102 and/or drive.

In an exemplary non-limiting application, the embodiment can represent an axis of a single- or multi-axis robot or positioning system in which the position of the object is controlled in response to position instructions generated by control unit 102.

In such applications the generator means 101 delivers a position profile to said control unit 102 and derivatives 108 of the position profile to said feed forward means 103. Said control unit 102 sends a controller output 105 instructing the drive to move the object to a desired position. A feedback signal 106 indicates a current position or velocity, etc. of the motor and/or of the object in substantially real-time. In servo-driven systems, feedback signal 106 can be generated, for example, by an encoder or resolver (not shown) that tracks an absolute or relative position of the motor. In sensor less systems lacking a velocity sensor, the feedback signal can be provided by a speed/position estimator. During a move operation, the control unit 102 monitors feedback signal 106 based on the filtered set point profile 109 and an error signal 110 to ensure, that the object has accurately reached the target position.

Therefore control unit 102 compares via a summation means 113 the actual position of the load as indicated by e.g. a position feedback signal 106 with a position set point profile 109, generated by the generator means 101 and filter 111, and adjusts the controller output 105 as needed to reduce or eliminate position error 110, which can be the output of the summation point 113. In some embodiments, said generator means 101 can be an integrated component of said control unit 102. Also the feed forward means 103 can be an integrated component of said control unit 102, all or parts of these components represented by computer readable code that can be executed on a processor comprised by said device 100 and stored on a memory comprised by said and/or attachable to said device 100.

In another exemplary scenario, the motion control application can be a speed control system in which the velocity of the object is controlled in accordance with controller output 105 representing the speed and generated by control unit 102. In such applications the generator means 101 and filter 111 provides a velocity profile to the control unit 102 and derivatives 108 of the velocity profile to the feed forward means 103. In this example, said control unit 102 provides an instruction to drive via controller output 105 to transition from a first velocity to a second velocity, and makes necessary adjustments to the controller output 105 based on velocity feedback signal 106. Behavior is similar to the behavior of the embodiment that generates position profiles. The velocity error 110 is calculated based on signals 109 and 106.

It is to be appreciated that the device 100, method 700 and techniques of the present disclosure are not limited to use with the exemplary types of motion control systems described above, but are applicable for any suitable control application. For example, some devices 100 may operate in an open-loop configuration, omitting feedback signal 106, some devices 100 may use only a first filter means 111 or only a second filter means 112 other may use both filter means 111, 112 as described above. Other embodiments may control temperatures or other process parameters or processes.

In some applications, control unit 102 will control the drive in accordance with set point profiles calculated by a higher-level control program, such as a program executed by a programmable logic controller (PLC) or other such controller. In such applications, the higher-level controller will determine the required target position and/or velocity of the motion device 100, and provide a motion profile to the control unit 102 for transitioning the object to the target position and/or velocity.

Other applications will comprise multiple drives coupled to said one control unit 102 or to multiple similar or equal control units 102, one for each drive or one for a number of drives, wherein said generator means 101 can be configured to generate multiple of said set point profiles, and preferable multiple derivatives for said multiple set point profiles, for controlling said multiple drives independent from each other for trajectory generation (multi-dimensional set point generation) with or without a feed forward contribution 107. In such an application the moving average filter 111, 112 not only increases the smoothness of the profile in general, it can also be used for blending of curves. A filtered set point can smoothly bridge the sharp angle between two line segments of a trajectory.

For example, some motion control systems may operate without feed forward means 103 in an open-loop or closed-loop configuration, omitting derivatives 108 of the set point profile. Such solutions can be used in application wherein fast and frequent changes of the set point profile are not an issue. A preferred solution is a drive comprising all or some of the functionality shown in FIG. 1.

Figure 2:
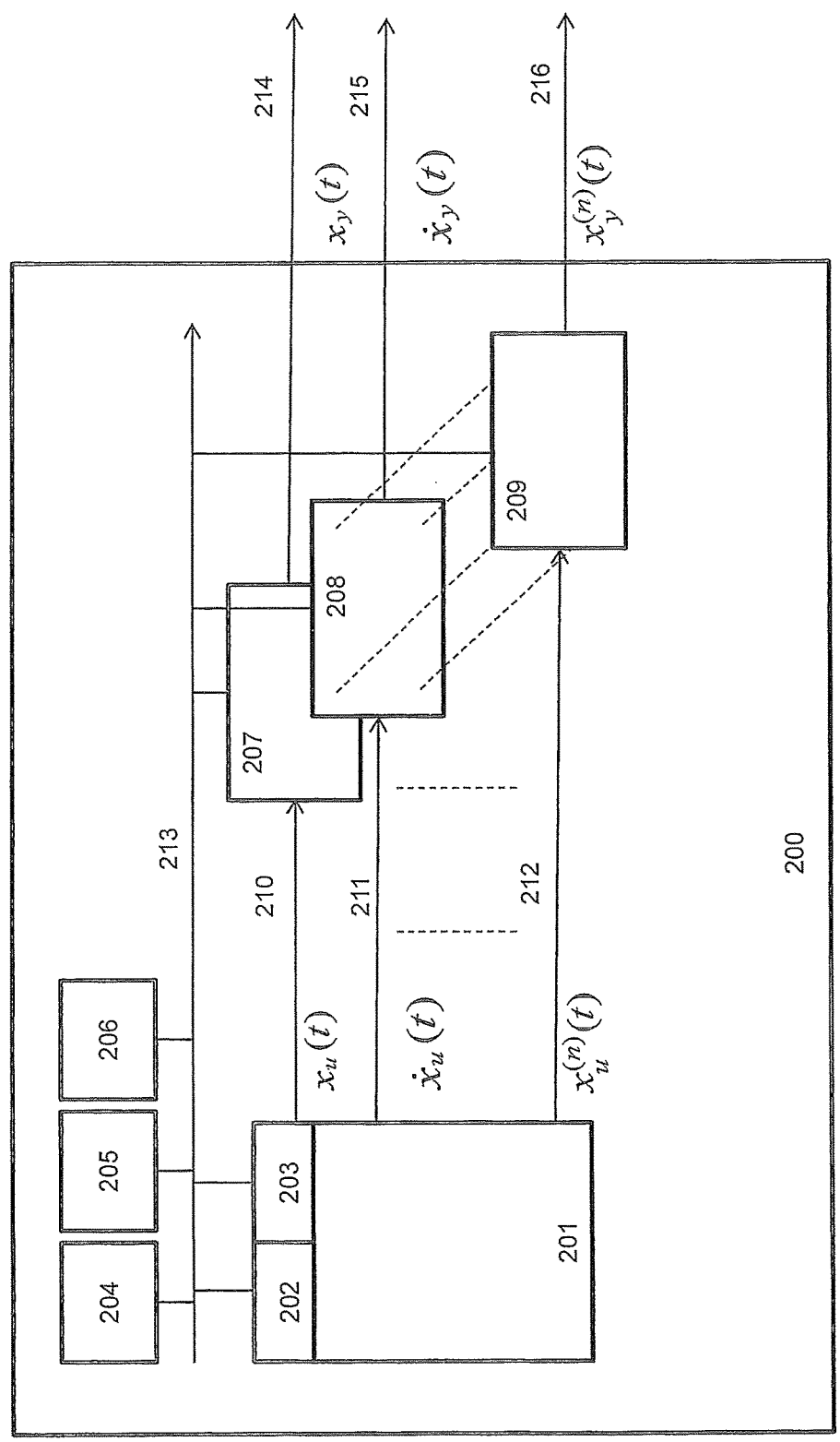
FIG. 2 shows a block diagram of an exemplary $(n+1)^{th}$ order set point generator.

FIG. 2 is a simplified block diagram of an exemplary non-limiting $(n+1)^{th}$ order generator means 101, 200, capable of generating set point profiles for time-optimized moves of an object, used in embodiments of this disclosure.

Said generator means 200 can include a $n^{th}$ order set point generator 201, comprising a position profile generator 202 and/or a velocity profile generator 203, an user interface component 204, one or more processors 205, memory 206 and one or more filters 207, 208, 209, wherein one or more (not shown) of said filters 207, 208, 209 can be designated for each single output 210, 211, 212 of the said set point generator 201. Said outputs 210, 211, 212 of said set point generator 201 can be coupled to the input of the said filers 207, 208, 209. The outputs 214, 215, 216 of said filters 207, 208, 209 can be configured to represent the output of said generator means 200, wherein output 214 can represent a position or velocity profile 214 and the outputs 215, 216 can represent derivatives of said position or velocity profile 214. By using moving average filters 207, 208, 209 the $n^{th}$ order set point generator 201 is changed into an $(n+1)^{th}$ order set point generator 200. User input can be, for example, user-entered constraints (e.g., maximum acceleration, maximum velocity, etc.), used by the said set point generator 201 to calculate said set point profile. Said set point generator 201 can be configured to receive an indication of a desired target position/velocity for an object (not shown) and calculate a set point profile for transitioning to the target position/velocity within the parameters of the user-defined constraints. In the present example moving average filters 207, 208, 209 are used. Alternatives can be weighted moving average filters 207, 208, 209, FIR filters 207, 208, 209, or IIR filters 207, 208, 209 or combinations thereof.

In various embodiments, one or more of the position profile generator 202, velocity profile generator 203, interface component 204, the one or more processor(s) 205, memory 206, and filters 207, 208, 209 can be electrically and/or communicatively coupled 213 to one another to perform one or more of the functions of said generator means 201.

In some embodiments the generator means 200 can comprise more filters 207, 208, 209 and/or more outputs 210, 211, 212, 214, 215, 216 than actually shown in FIG. 2 and/or a serial connection of filters (not shown) on each output 210, 211, 212. The minimum number of filters 207, 208, 209 that can be comprised can be calculated as according to the following formula:

Number of filters=n+1, wherein n represents the order of the set point generator 201 used in the embodiment. In this case every output of the filter is coupled to a filter.

In some embodiments, components 202, 203, 204 207, 208, 209 can comprise software instructions stored on said memory 206 and executed by processor(s) 205. Said set point generator(s) 201, 202, 203 may also interact with other hardware and/or software components not depicted in FIG. 2. For example, processor(s) 205 may interact with one or more external user interface devices, such as a keyboard, a mouse, a display monitor, a touch screen, or other such interface devices.

In some embodiments, said output 210 can deliver set points generated as a function of time for a target position, wherein other outputs 211, 212 represent derivatives (not all shown) thereof to implement a position control system. In other embodiments, said output 210 can deliver set points generated as a function of time for a target velocity, wherein other outputs 211, 212 represent derivatives (not all shown) thereof to implement a velocity control system.

Due to the properties of the moving average filters 207, 208, 209 mentioned above (see also description of FIG. 1) for the $(n+1)^{th}$ order generator means 200 shown in FIG. 2, this can have the following consequences:

The $(n+1)^{th}$ order set point generator satisfies the same constraints as the $n^{th}$ order set point generator.

Constraint modifications of the n-th order set point generator on the fly take effect in the $(n+1)^{th}$ order set point generator at most the moving average time later than for the $n^{th}$ order set point generator.

If the $n^{th}$ order set point generator generates consistent signals (i.e. velocity is the derivative of position, acceleration is the derivative of velocity, etc.), the signals of the $(n+1)^{th}$ order set point generator are also consistent.

The duration of a profile, generated by the $(n+1)^{th}$ order set point generator is exactly the moving average time longer than the duration of the profile generated by the $n^{th}$ order set point generator.

If the $n^{th}$ order set point generator is time-optimal, and all constraints are reached and maintained for at least the moving average time, then also the $(n+1)^{th}$ order set point generator generates a time-optimal profile with the same constraints on the first n derivatives of the position as for the n-th order set point generator, and a constraint $X_{n,max}/T_{MA}$ on the $(n+1)^{th}$ derivative, where $X_{n,max}$ is the constraint on the $n^{th}$ derivative of the position of the $n^{th}$ order set point generator.

Applying a single moving average filter 207, 208, 209 to a time-optimal set point generator 201, 202, 203 in general results in a new set point generator 200 which (nearly) gives time-optimal solutions. The duration will be well bounded in time, and the profile is made smoother.

In further embodiments further smoothening can be obtained by applying more additional moving average filter on the outputs of said set point generator(s) 201, 202, 203. In an exemplary embodiment using the set point generator showed in FIG. 2 this can result in a cascade (not shown) of at least two or more moving average filters on one or more outputs 201, 211, 212 of said set point generator 201, 202, 203.

In general, a cascade of m moving average filters, possibly with different lengths, can be applied to obtain a set point generator 200 of order n+m. It is recommended to choose n (order of basic set point generator) as large as possible and m as large as necessary depending on the required performance of the mechanical system.

For point-to-point generation from standstill with no end-point correction or no on-the-fly constraint modification needed, a $4^{th}$ order set point generator 101 is suggested for the basic set point generator 101 shown in FIG. 1.

For point-to-point generation for which end-point correction or on-the-fly constraint modification is needed, a $3^{rd}$ order set point generator 101 is suggested for the basic set point generator 101 shown in FIG. 1.

A cascade of moving average filters can be combined to a single FIR filter with gain 1. Also FIR filters with gain 1, which are not typically created by cascading moving average filters, can be applied for achieving smoother set point profiles.

While FIG. 2 depicts said generator means 200, 201 as including both the position profile generator 202 and the velocity profile generator 203, it is to be appreciated that some embodiments of said set point generator 200, 201 may include only one of the position profile generator 202 or the velocity profile generator 203 without deviating from the scope of this disclosure. The one or more processors 205 can perform one or more of the functions described herein with reference to the drive 100 and/or methods disclosed. Memory 206 can be a computer-readable storage medium storing computer-executable instructions and/or information for performing the functions described herein with reference to the systems and/or methods disclosed.

Figure 3:
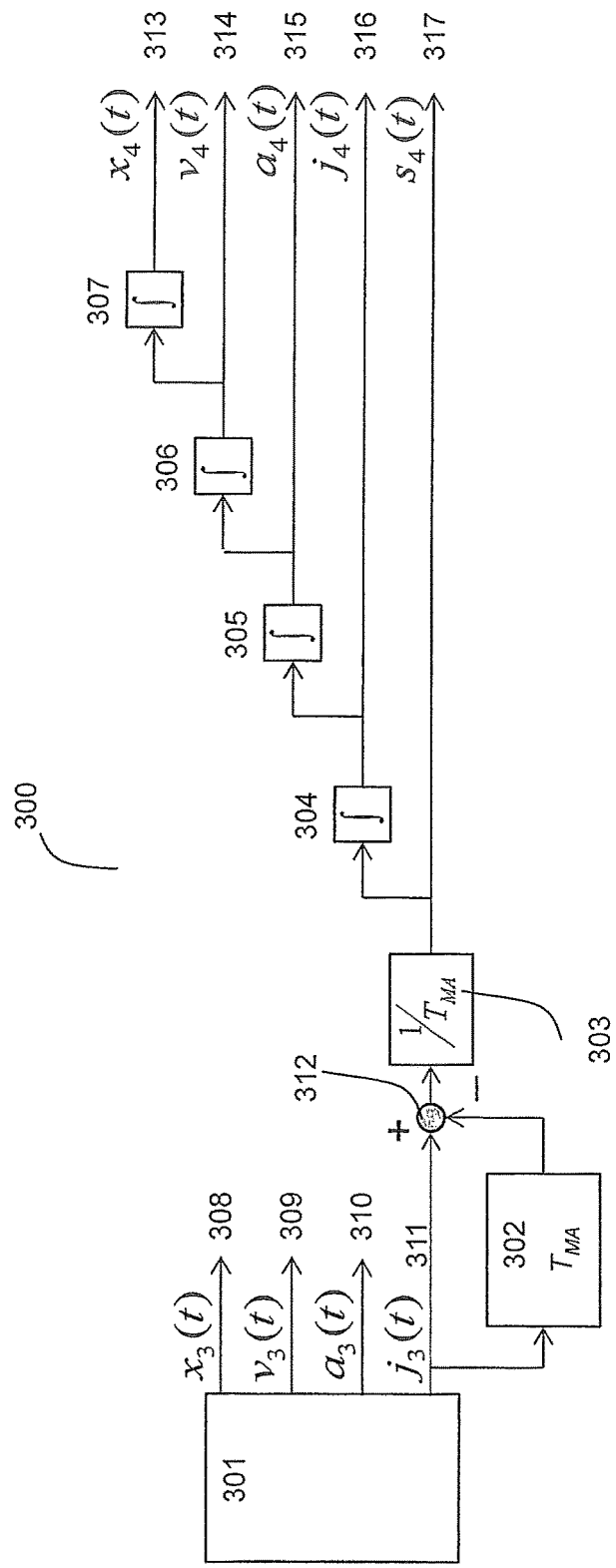
FIG. 3 shows a block diagram of an exemplary $4^{th}$ order set point generator.

FIG. 3 illustrates an exemplary block diagram of a $4^{th}$-order generator means 300 to one or more embodiments of this disclosure, said embodiment can comprise a $3^{rd}$-order set point generator 301, with exemplary first outputs for a position profile 308, velocity profile 309, acceleration profile 310 and a jerk profile 311. The jerk profile 311 output can be connected to a structure 302, 303, 312, wherein a first component 302 of said structure represents a delay component 302, that can cause a jerk profile time delay $T_{MA}$, the second component of said structure can represent a summation component 312, that can summarize said data from said jerk profile 311 output with said delayed data from said jerk profile 311 output and a third component 303 of said structure, representing a component that can multiply said summarized data by the inverse of said defined time delay $1/T_{MA}$.

The output s4(t) of said structure 302, 303, 312 equals:

$$s_4(t)=(j_3(t)-j_3(t-T_{MA}))/T_{MA}$$

wherein the right hand side of the equation shows what is attained by said structure 302, 303, 312. Said structure 302, 303, 312 can filter the output 311 of said $3^{rd}$-order set point generator 301, said output 311 in this example is a jerk profile 311, to obtain the derivative of the jerk of a $4^{th}$-order set point generator 300, which represents the snap profile 317.

By means of the integration components 304 to 307, shown in FIG. 3, additional outputs of the $4^{th}$ order generator are obtained, viz. the jerk profile 316, the acceleration profile 315, the velocity profile 314, and finally the position profile 313. The generated $4^{th}$ order profile 313 to 317 is constrained based and time-optimal. Profile 313 can be used as set point profile 109 for said control unit 102 shown in FIG. 1 and profiles 314 to 317 can be used as set point derivatives 108 for said feed forward control 103, all shown in FIG. 1.

Note that in the exemplary embodiment shown in FIG. 3 the position x3(t), velocity v3(t) and acceleration a3(t) outputs are not used. They are however of interest for the determination of the modifications in the jerk profile, when an end-point correction or constraint modification is required for a moving axis.

While FIG. 3 depicts said $4^{th}$-order generator means 300 as including several single integration stages 304 to 307 and a filter structure 302, 303, 317, it is to be appreciated that in some scenarios, some embodiments of said set point generator means 300 may include more structures. It is to be understood that the architecture depicted in FIG. 3 is only intended to be an exemplary context in which said generator means 300 may operate, and that other operating contexts are within the scope of this disclosure.

Figure 4:
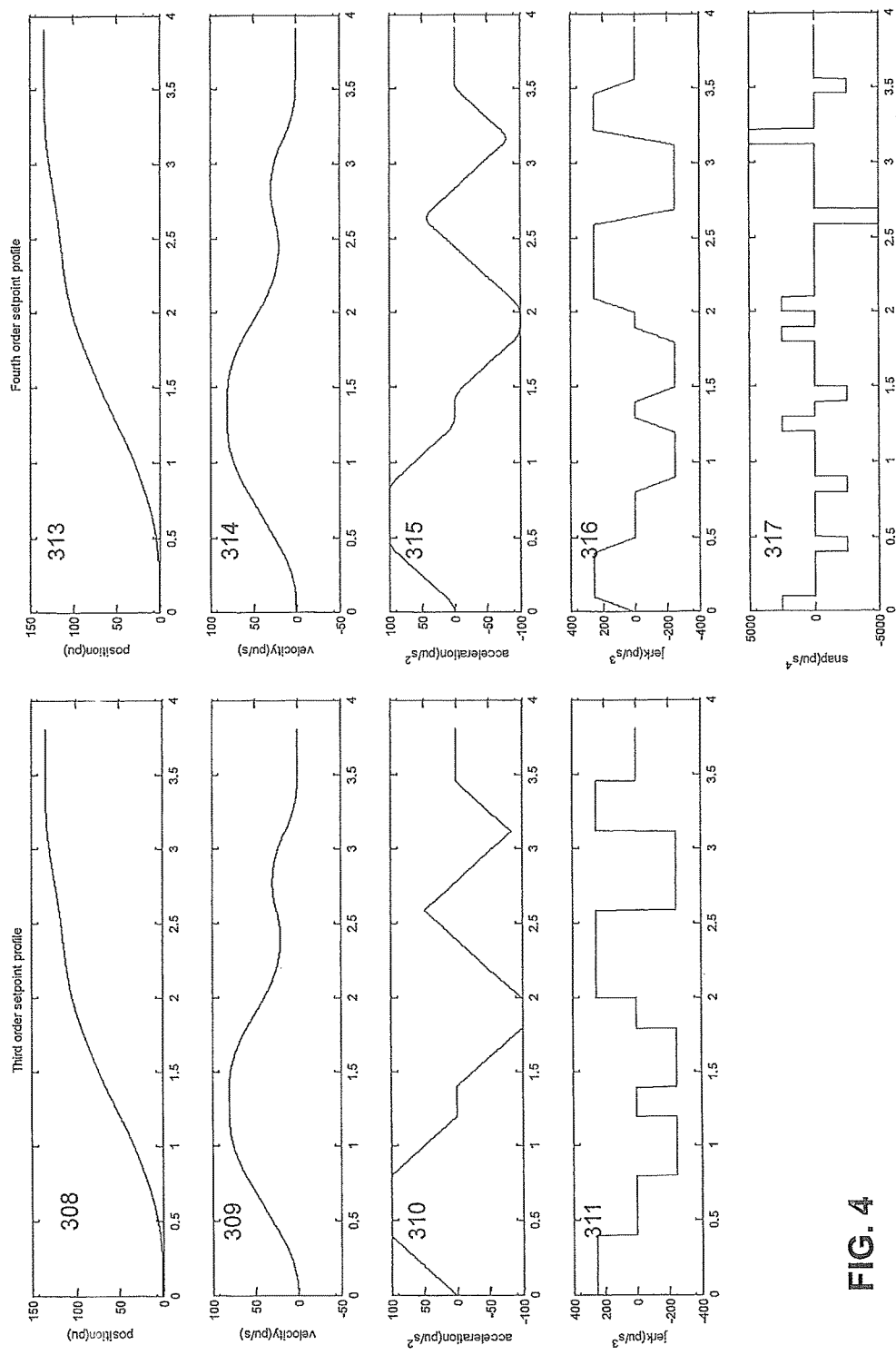
FIG. 4 shows signals x3(t) to j3(t) and x4(t) to s4(t) of the generator shown in FIG. 3.

FIG. 4 depicts on the left side exemplary time-optimal profiles of said exemplary outputs for said position profile 308, velocity profile 309, acceleration profile 310 and a jerk profile 311 of said $3^{rd}$ order set point generator shown in FIG. 3. FIG. 4 depicts on the right side exemplary profiles of said exemplary further outputs 313 to 317, generated by means of said integration said stages 304 to 307 and filter structure 302, 303, 312 shown in FIG. 3.

In this examples from said exemplary first outputs for a position profile 308, velocity profile 309, acceleration profile 310 and a jerk profile 311 the second outputs representing said second position profile 313, velocity profile 314, acceleration profile 315, jerk profile 316, and a snap profile 317 are generated according to the exemplary implementation of the generator means 300 shown in FIG. 3.

In this examples the dashed lines show the original profile and the solid lines show profiles with end point correction at t=2. Other embodiments can have no end point correction.

By application of the moving average filter comprising blocks 302, 303, 312, 304, the jerk profile of the third order generator 311, which is piecewise constant, changes into the jerk profile of the fourth order generator 316, which is piecewise linear. In addition, the acceleration profile of the third order generator 310, which is piecewise linear, changes into the acceleration profile of the fourth order generator 315, which is built-up by polynomial segments of order <=2. In addition, the velocity profile of the third order generator 309, which is built-up by polynomial segments of order <=2, changes into the velocity profile of the fourth order generator 314, which is built-up by polynomial segments of order <=3. Finally, the position profile of the third order generator 308, which is built-up by polynomial segments of order <=3, changes into the position profile of the fourth order generator 313, which is built-up by polynomial segments of order <=4.

For the fourth order generator, the snap 317 is well defined. In the feed forward controller, the snap can contribute to avoidance of excitation of a specific frequency in the system under control.

Figure 5:
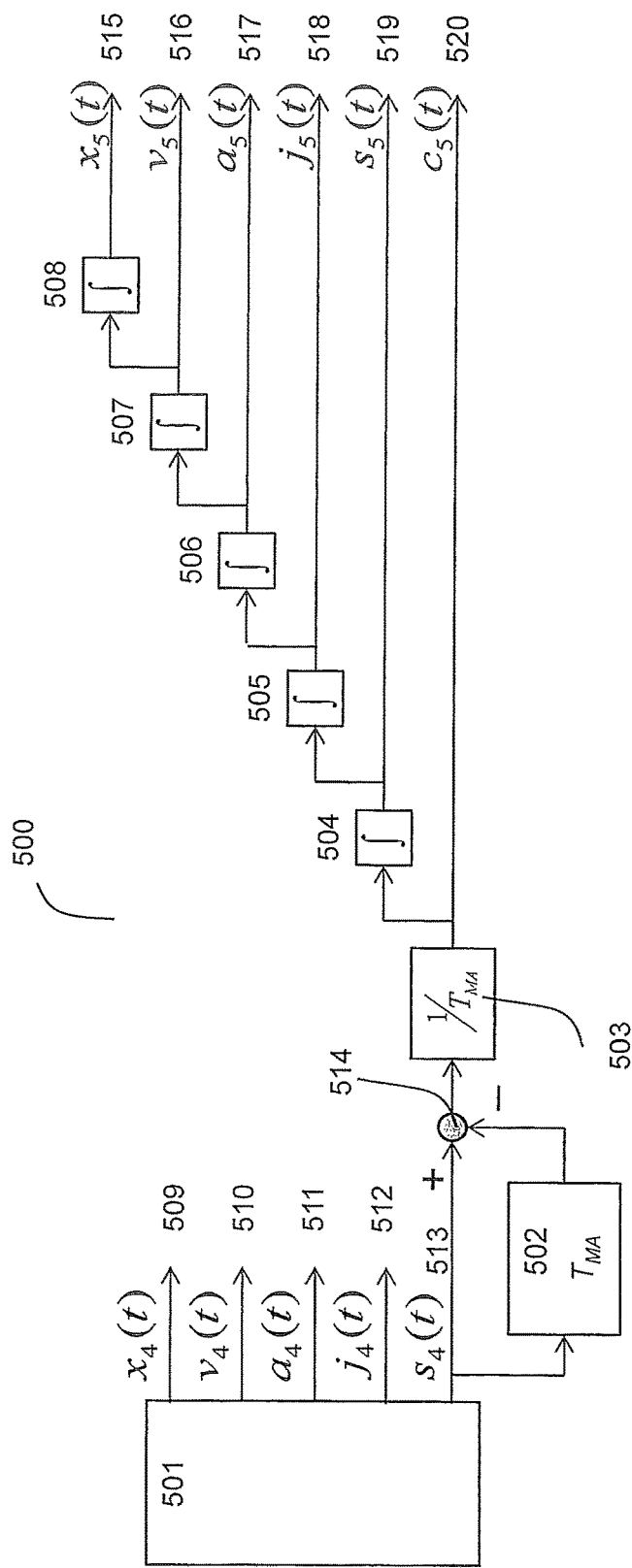
FIG. 5 shows a block diagram of an exemplary 5$^{th}$ order set point generator.

FIG. 5 illustrates an exemplary block diagram of a $5^{th}$-order generator means 500 for one or more embodiments of this disclosure, that can comprise a $4^{th}$-order set point generator 501, with exemplary first outputs for a position profile 509, velocity profile 510, acceleration profile 511, a jerk profile 512, and a snap profile 513. The output 513 of said generator means 500 can be connected to a structure 502, 503, 514, wherein a first component 502 of said structure represents a delay component, that can cause a snap profile time delay $T_{MA}$, the second component of said structure can represent a summation component 514, that can summarize said data from said snap profile 513 output with said delayed data from said snap profile 513 output and a third component 503 of said structure, representing a component that can multiply said summarized data by the inverse of said defined time delay $1/T_{MA}$.

The output y(t) of said structure 502, 303, 314 equals:

$$c_5(t)=s_4(t)-s_4(t-T_{MA}))/T_{MA}$$

wherein the right hand side of the equation shows what is attained by said structure 502, 503, 514. Said structure 502, 503, 514 can filter the output 513 of said $4^{th}$-order set point generator 501, said output 513 in this example is a snap profile 513, to obtain the derivative of the snap of a $5^{th}$-order set point generator 500, which represents the crackle profile 520.

From said filtered 4$^{th}$ order output 513 further outputs 515 to 519 are generated by means of integration the stages 504 to 508 shown in FIG. 5. Output 519 represents the second snap profile 519 generated via integration of the crackle profile 520. Output 518 represents the second jerk profile 518 generated via integration of the snap profile 519. Output 517 represents a second acceleration profile 517, generated via integration of the second jerk profile 518. Output 516 represents a second velocity profile 516, generated via integration of the second acceleration profile 517. Output 515 represents a second position profile 515, generated via integration of the second velocity profile 516. If the 4$^{th}$ order profile 509 to 513 is constraint based, time-optimal, the generated profiles 515 to 520 are constrained and (nearly) time-optimal. Profile 515 can be used as set point profile 109 for said control unit 102 shown in FIG. 1 and profiles 516 to 520 can be used as set point derivatives 108 for said feed forward control 103 shown in FIG. 1.

Note that in the exemplary embodiment shown in FIG. 5 the position x4(t), velocity v4(t), acceleration a4(t), snap s4(t) outputs are not used. They are however of interest for the determination of the modifications in the snap profile, when an end-point correction or constraint modification is required for a moving axis.

While FIG. 5 depicts said 5$^{th}$-order generator means 500 as including several single integration stages 504 to 508 and a filter structure 502, 503, 514, it is to be appreciated that in some scenarios, some embodiments of said set point generator 500 may include more than one of said structure 502, 503, 514. It is to be understood that the architecture depicted in FIG. 5 is only intended to be an exemplary context in which generator means 500 may operate, and that other operating contexts are within the scope of this disclosure.

Figure 6:
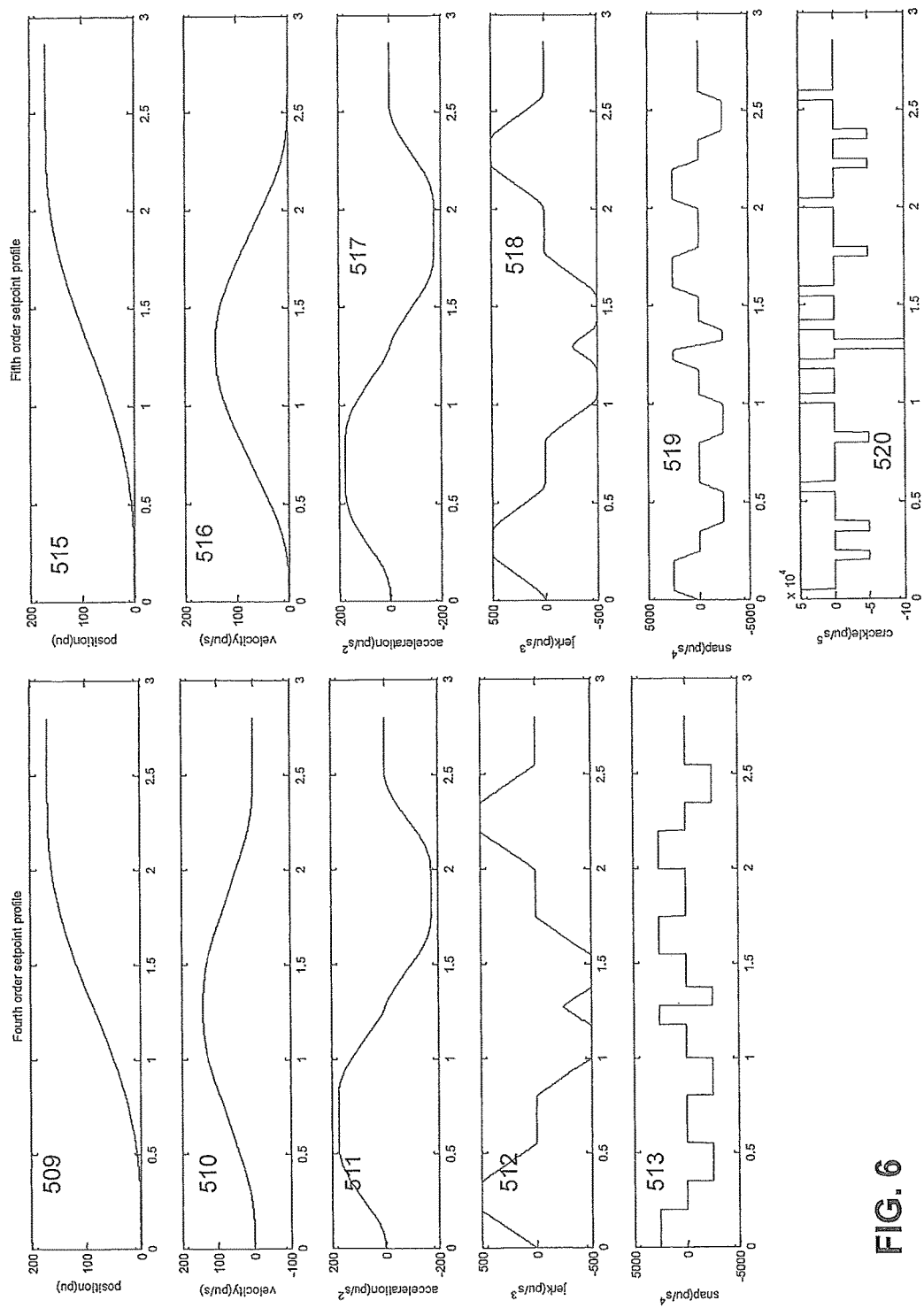
FIG. 6 shows signals x4(t) to s4(t) and x5(t) to c5(t) of the generator shown in FIG. 5.

FIG. 6 depicts on the left side exemplary time-optimal point-to-point profiles of said exemplary outputs for a position profile 509, velocity profile 510, acceleration profile 511, a jerk profile 512 and a snap profile 512 of the 4$^{th}$ order set point generator shown in FIG. 5. FIG. 6 depicts on the right side exemplary profiles of said exemplary further outputs 515 to 520, generated by means of said integration stages 504 to 508 shown in FIG. 5.

In this examples from said exemplary first outputs for a position profile 509, velocity profile 510, acceleration profile 511, a jerk profile 512 and snap profile 513 the second outputs representing said second position profile 515, velocity profile 516, acceleration profile 517, jerk profile 518, snap profile 519 and crackle profile are generated according to the exemplary implementation of the generator means 500 shown in FIG. 5, which is in this case a 5$^{th}$ order profile after filtering with a moving average filter By application of the moving average filter comprising blocks 502, 503, 514, 504, the snap profile of the fourth order generator 513, which is piecewise constant, changes into the snap profile of the fifth order generator 519, which is piecewise linear. In addition, the jerk profile of the fourth order generator 512, which is piecewise linear, changes into the jerk profile of the fifth order generator 518, which is built-up by polynomial segments of order <=2. In addition, the acceleration profile of the fourth order generator 511, which is built-up by polynomial segments of order <=2, changes into the acceleration profile of the fifth order generator 517, which is built-up by polynomial segments of order <=3. In addition, the velocity profile of the fourth order generator 510, which is built-up by polynomial segments of order <=3, changes into the acceleration profile of the fifth order generator 516, which is built-up by polynomial segments of order <=4. Finally, the position profile of the fourth order generator 509, which is built-up by polynomial segments of order <=4, changes into the position profile of the fifth order generator 515, which is built-up by polynomial segments of order <=5. For the fifth order generator, the crackle 520 is well defined. In the feed forward controller, the crackle can contribute to avoidance of excitation of a specific frequency in the system under control. In this examples no end point correction is provided.

Figure 7:
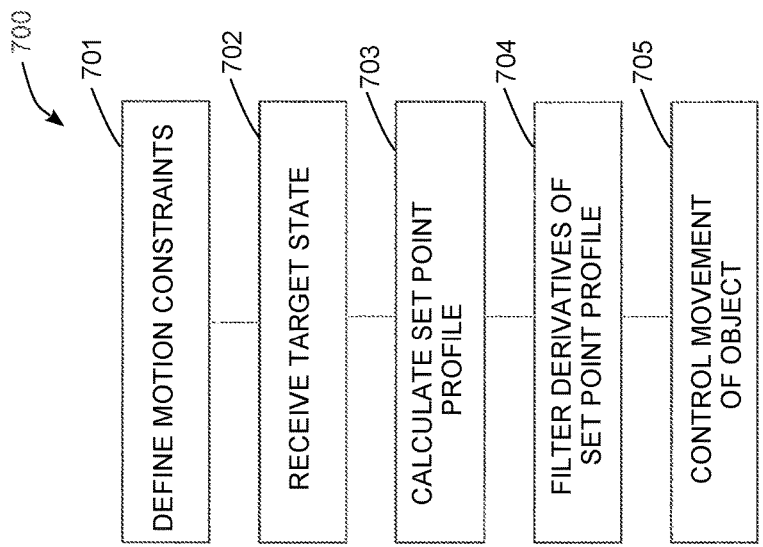
FIG. 7 depicts a flow chart of an exemplary implementation of the method.

FIG. 7 illustrates an exemplary methodology 700 for moving an object. At step 701 a set of motion constraints can be defined. These constraints can represent physical constraints of a mechanical system configured to move said object, and can include limits on velocity, acceleration, deceleration, jerk, snap, and crackle. The constraints can also include a definition of the sample time used for a control unit configured to control the mechanical system.

At step 702 a target state can be received, which can indicate at least one of a target state of said object, for example a target position or a target velocity. At step 703 in response to the target state received a set point profile can be calculated for traversing the object from its current state to the new state. The profile can be calculated by a generator means 101, 200, 300, 500 which can be comprised by a motion control device 100. During step 703 further outputs can be generated based on derivatives of said set point profile. At step 704 said set point profile and/or said derivatives are filtered, wherein the result of said filtering is used as final set point profiles for said device 100 and for controlling the mechanical system while traversing the object to the target motion value.

All the steps mentioned above, especially generating said profile via generating means 101, 200, 300, 500 and processing said generated profiles via filter means 111, 112, 207 to 209, 302, 303, 312, 502, 503, 514 can be implemented by software and/or hardware. Said software and/or hardware can be comprised by said device 100 or by an external device coupled to said device 100. Said device 100 can also comprise one or more processor(s) and one or more memory(s). Said software being stored on said memory(s) and executable by said processor(s). In other embodiments pure hardware solutions can be implemented, e.g. using hardware programming languages like VHDL.

At step 705 the mechanical system is instructed to traverse from the current state to the target state with or without end point correction on the fly or not. This can entail, for example, providing the motion profile calculated at step 703 to a drive, which controls a motor that drives the mechanical system in accordance with the motion profile and a feedback signal 106 providing measured real-time state data for the mechanical system. For controlling the mechanical system while traversing the object to the target motion value in various embodiments feed forward contribution is used during step 705, wherein this feed forward contribution is calculated and added to the control signals used to control the mechanical system.

An exemplary but non-limiting target motion state can be represented by a target position for the object generated as a function of time, wherein said derivatives represent a velocity as a function of time or an acceleration and higher derivatives as a function of time. In various embodiments multiple of said set point profiles can define a trajectory for said moving object and wherein also a multiple of derivatives of said multiple set points profiles are generated. An example for said filtering can be an averaging of said set points over a configurable number of samples based on a set point sample rate or over a configurable time interval. Some embodiments may use a weighted average. In some embodiments profiles are preprocessed to provide a constraint-based substitution for the current set point profile before the object is moving from one point to another point. In the same or in other embodiments profiles are processed within a fraction of a sample period of said system to provide a constraint based substitution on the fly while the object is moving. It can be appreciated that some embodiments comprise both, preprocessing and processing on the fly and other embodiments comprise either preprocessing and processing on the fly to provide an end-point correction for a moving object.

A non-limiting exemplary for an application is an apparatus, comprising a first drive configured to move a substrate and a control unit 102 coupled to said first drive and configured to control said first drive, a generator means 101 configured to generate a first output for said control unit and a filter means 111, 112 with a filter input coupled to said generator 101 and with a filter output coupled to a first control unit 102 input, wherein said filter 111, 112 is configured to filter said first generator output, wherein said first generator output for said first control unit input is a set point generated as a function of time. This embodiment can include for example an endpoint correction as mentioned above, said endpoint correction can be vision-based, e.g. based on camera inspection. The apparatus can be configured as a pick & place machine for manufacturing a substrate in the semiconductor industry In various embodiments of such an apparatus the substrate can be a wafer or a PCB that has to be moved between two areas, for example a critical to a non-critical area, wherein in the critical constraints on velocity and acceleration are stricter compared to the non-critical area. The critical area can be a vacuum chamber.

In such an apparatus the various concepts of the invention makes set point profiles like position profiles or velocity profiles smoother, which allows a better feed forward thus improving control performance of servo axes comprised by such apparatuses. The invention allows for example to implement high order set point profiles with velocity modifications on the fly, that do not result in violation of constraints on acceleration, jerk and snap.

This way, excitation of resonances in motion system can be avoided or at least be reduced. The increased motion performance leads to shortening of throughput times, increased product quality and reduction of the wear of machine parts.

The aforementioned devices, machines and methodologies have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures (e.g., FIG. 7).

While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing steps or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

The invention claimed is:

1. A device for moving an object, comprising:
   a first drive operably connected to the object for moving the object; and
   a control unit operably connected to the first drive and including a first input that receives an error signal corresponding to a sum of a position set point profile from a generator and a position feedback signal from the first drive, a second input that receives a feed forward output signal, and a control unit output;
   a feed forward control with an input that receives a feed forward input signal from the generator and an output coupled to the second input of the control unit, the feed forward control being configured to generate the feed forward output signal corresponding to at least one set point profile received from the generator; and
   the generator having a first output configured to generate the set point profile for the error signal of the first input of the control unit and a second output coupled to the input of the feed forward control, the generator further comprising:
      a set point generator, the set point generator being configured to generate a piecewise constant set point profile output corresponding to a third-order jerk of the object as a function of time based on a target position for the object;
      a filter structure having an input that receives the set point profile output of the set point generator, the filter structure being configured to generate a set point profile corresponding to a fourth-order snap of the object as a function of time;
      a first integration stage having an input that receives the set point profile generated by the filter structure, the first integration stage being configured to generate a set point profile corresponding to a piecewise-linear representation of the third-order jerk of the object as a function of time through the second output coupled to the feed forward control;

a second integration stage having an input that receives the set point profile generated by the first integration stage, the second integration stage being configured to generate a set point profile output corresponding to a plurality of polynomial segments of order <=2 representation of a second-order acceleration of the object as a function of time;

a third integration stage having an input that receives the set point profile generated by the second integration stage, the third integration stage being configured to generate a set point profile output corresponding to a plurality of polynomial segments of order <=3 representation of a first-order velocity of the object as a function of time; and a fourth integration stage having an input that receives the set point profile generated by the third integration stage, the fourth integration stage being configured to generate a set point profile output corresponding to a plurality of polynomial segments of order <=4 representation of a zero-order position of the object as a function of time through the first output, wherein the control unit is configured to generate a control unit output signal at the control unit output that is based on the feed forward output signal and the error signal, and wherein the control unit is configured to perform motion control of the object by supplying the control unit output signal to the first drive, such that the first drive moves the object with increased control performance.

2. The device of claim 1, the filter structure further comprising:

a delay component coupled to the set point generator and configured to generate a time-delayed set point profile output using a predetermined time delay;

a summation component coupled to the set point generator and the delay component, the summation component being configured to generate an output of a sum of the set point profile output from the set point generator and the time-delayed set point profile output from the delay component; and a multiplier component coupled to the summation component, the multiplier component being configured to multiply the output of the summation component by an inverse of the predetermined time delay to generate the set point profile corresponding to the fourth-order snap of the object as the function of time.

3. The device of claim 1, the filter structure being further configured to:

generate the set point profile corresponding to the fourth-order snap of the object as the function of time through the second output coupled to the feed forward control.

4. The device of claim 3 wherein the filter structure generates the set point profile corresponding to the fourth-order snap of the object as a piecewise constant function of time.

5. The device of claim 1 wherein the filter structure provides a finite input response (FIR) or an infinite input response (IIR) filter.

6. The device of claim 1 wherein the second integration stage is further configured to generate the set point profile output corresponding to the plurality of polynomial segments of order <=2 representation of the second-order acceleration of the object as the function of time through the second output coupled to the feed forward control.

7. The device of claim 6 wherein the third integration stage is further configured to generate the set point profile output corresponding to the plurality of polynomial segments of order <=3 representation of the first-order velocity of the object as the function of time through the second output coupled to the feed forward control.

8. A method for performing motion control of an object with a motion control device including a generator, the method comprising:

receiving, with the generator, at least one motion constraint;

receiving, with the generator, at least one target motion value indicating a target state of a position of the object as a function of time;

generating, with a set point generator, a piecewise constant set point profile output corresponding to a third-order jerk of the object as a function of time based on the at least one target motion value;

filtering, with a filter structure having an input coupled to the set point generator, the set point profile output from the set point generator to generate set point profile corresponding to a fourth-order snap of the object as a function of time;

generating, with a first integration stage having an input that receives the set point profile generated by the filter structure, a set point profile corresponding to a piecewise-linear representation of the third-order jerk of the object as a function of time through a first output coupled to a feed forward control that generates a feed forward signal;

generating, with a second integration stage having an input that receives the set point profile generated by the first integration stage, a set point profile output corresponding to a plurality of polynomial segments of order <=2 representation of a second-order acceleration of the object as a function of time;

generating, with a third integration stage having an input that receives the set point profile generated by the second integration stage, a set point profile output corresponding to a plurality of polynomial segments of order <=3 representation of a first-order velocity of the object as a function of time; and generating, with a fourth integration stage having an input that receives the set point profile generated by the third integration stage, a set point profile output corresponding to a plurality of polynomial segments of order <=4 representation of a zero-order position of the object as a function of time through a second output coupled to a control unit;

generating with the control unit a control unit output signal that is based on the set point profile from the fourth integration stage and the feed forward signal of the feed forward control, and performing motion control of the object with the control unit by supplying the control unit output signal to a drive unit configured to move the object with increased control performance.

9. A device for moving an object, comprising:

a first drive operably connected to the object for moving the object; and a control unit operably connected to the first drive and including a first input that receives an error signal corresponding to a sum of a velocity set point profile from a generator and a velocity feedback signal from the first drive, a second input that receives a feed forward output signal, and a control unit output;

a feed forward control with an input that receives a feed forward signal from the generator and an output coupled to the second input of the control unit, the feed forward control being configured to generate a feed forward output signal corresponding to at least one set point profile received from the generator; and the generator having a first output configured to generate the set point profile for the error signal of the first input of the control unit and a second output coupled to the input of the feed forward control, the generator further comprising:
- a set point generator, the set point generator being configured to generate a piecewise constant set point profile output corresponding to a third-order jerk of the object as a function of time based a target velocity for the object;
- a filter structure having an input that receives the set point profile output of the set point generator, the filter structure being configured to generate a set point profile corresponding to a fourth-order snap of the object as a function of time;
- a first integration stage having an input that receives the set point profile generated by the filter structure, the first integration stage being configured to generate a set point profile corresponding to a piecewise-linear representation of the third-order jerk of the object as a function of time through the second output coupled to the feed forward control;
- a second integration stage having an input that receives the set point profile generated by the first integration stage, the second integration stage being configured to generate a set point profile output corresponding to a plurality of polynomial segments of order <=2 representation of a second-order acceleration of the object as a function of time;
- a third integration stage having an input that receives the set point profile generated by the second integration stage, the third integration stage being configured to generate a set point profile output corresponding to a plurality of polynomial segments of order <=3 representation of a first-order velocity of the object as a function of time through the first output, wherein the control unit is configured to generate a control unit output signal at the control unit output that is based on the error signal and the feed forward output signal, and wherein the control unit is configured to perform motion control of the object by supplying the control unit output signal to the first drive, such that the first drive moves the object with increased control performance.

10. The device of claim 9, the filter structure further comprising:
- a delay component coupled to the set point generator and configured to generate a time-delayed set point profile output using a predetermined time delay;
- a summation component coupled to the set point generator and the delay component, the summation component being configured to generate an output of a sum of the set point profile output from the set point generator and the time-delayed set point profile output from the delay component; and
- a multiplier component coupled to the summation component, the multiplier component being configured to multiply the output of the summation component by an inverse of the predetermined time delay to generate the set point profile corresponding to the fourth-order snap of the object as the function of time.

11. The device of claim 9, the filter structure being further configured to:
generate the set point profile corresponding to the fourth-order snap of the object as the function of time through the second output coupled to the feed forward control.

12. The device of claim 11 wherein the filter structure generates the set point profile corresponding to the fourth-order snap of the object as a piecewise constant function of time.

13. The device of claim 9 wherein the filter structure provides a finite input response (FIR) or an infinite input response (IIR) filter.

14. The device of claim 9 wherein the second integration stage is further configured to generate the set point profile output corresponding to the plurality of polynomial segments of order <=2 representation of the second-order acceleration of the object as the function of time through the second output coupled to the feed forward control.

* * * * *